Oct. 11, 1949.    C. A. DE GIERS    2,484,690
ELECTRIC LIQUID LEVEL INDICATING DEVICE
Filed July 24, 1947    3 Sheets-Sheet 1
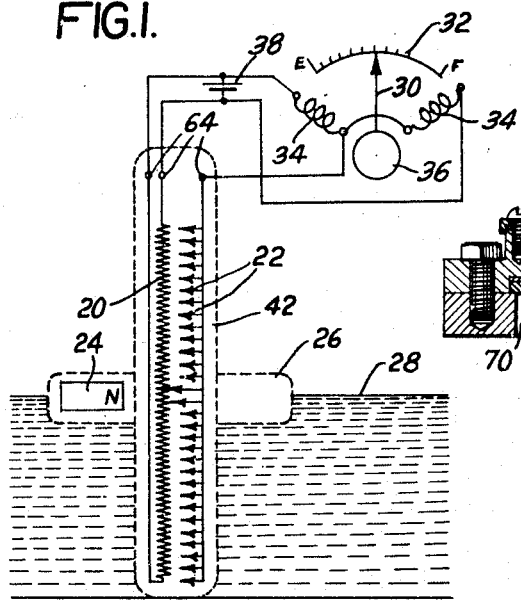
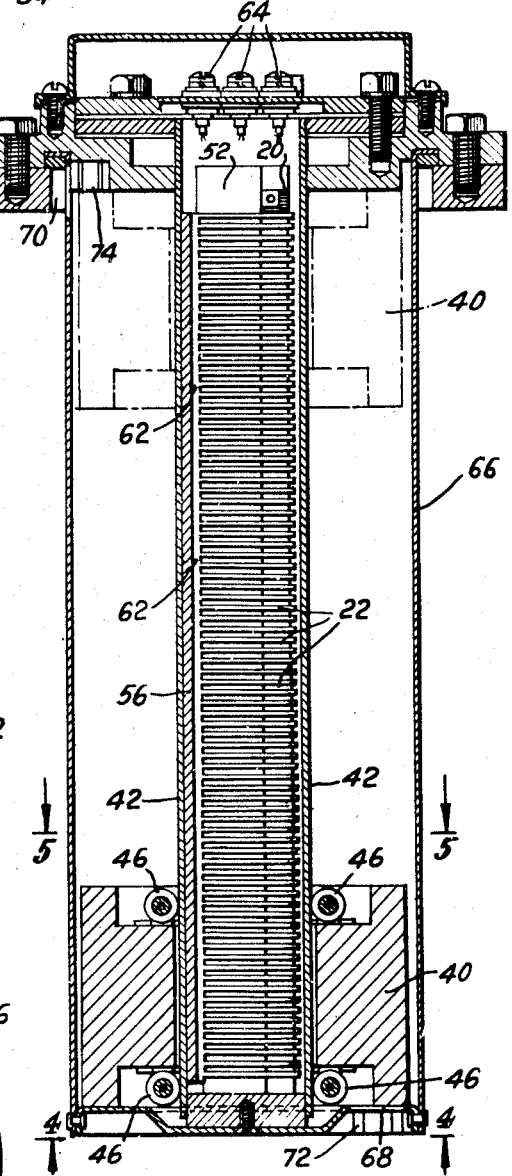
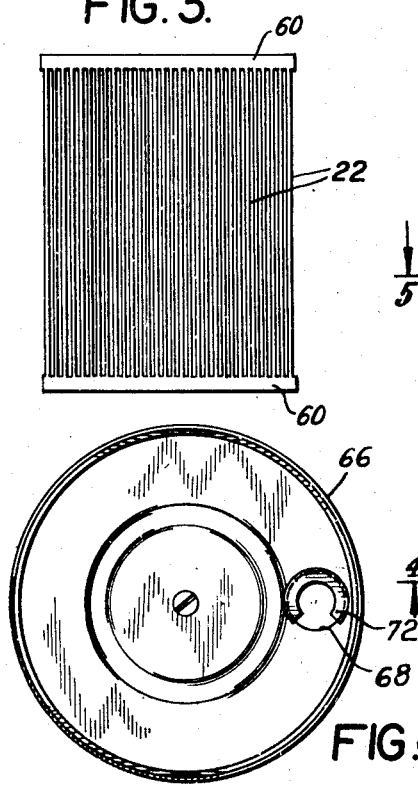
INVENTOR.
CLARENCE A. DE GIERS
BY Robert S. Dunlap
ATTORNEY Oct. 11, 1949.   C. A. DE GIERS   2,484,690
ELECTRIC LIQUID LEVEL INDICATING DEVICE
Filed July 24, 1947   3 Sheets-Sheet 2
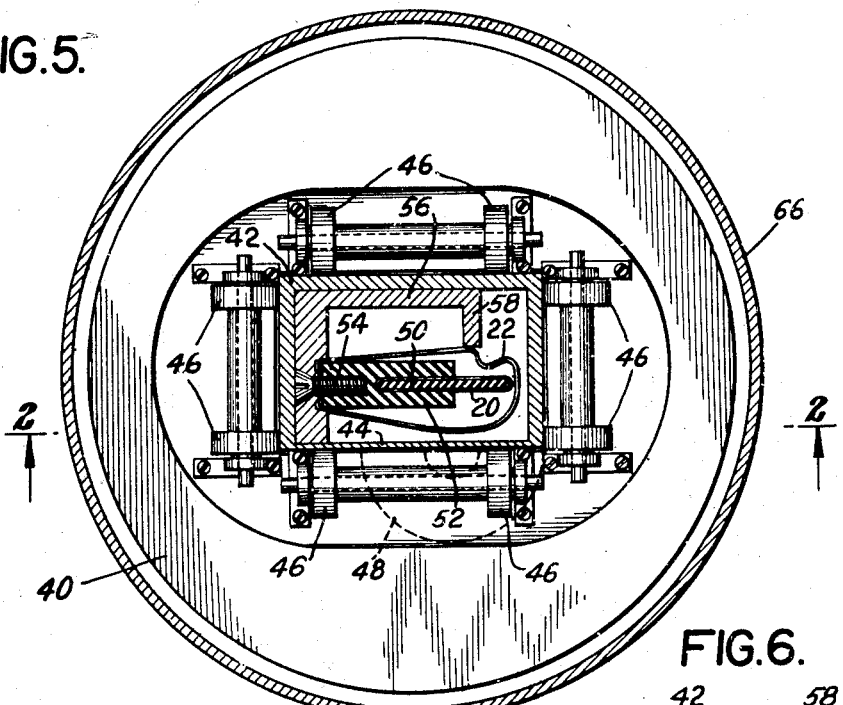
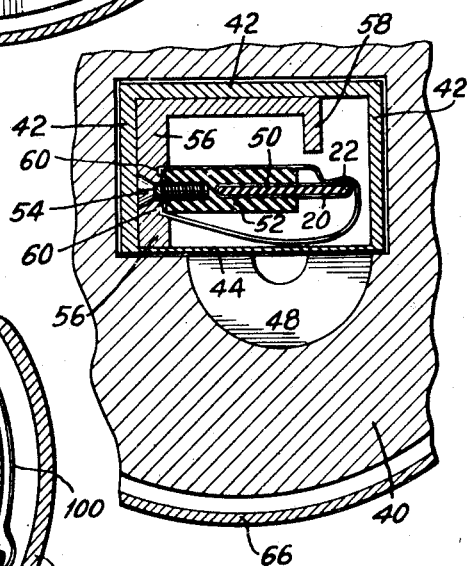
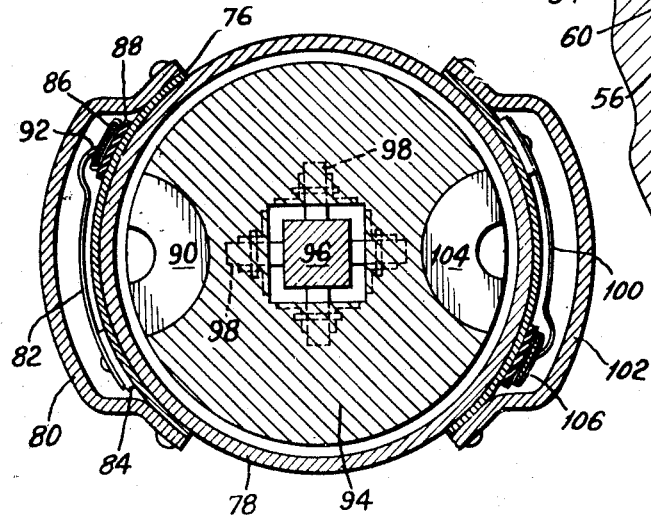
INVENTOR.
CLARENCE A. DE GIERS
BY Robert S. Dunham
ATTORNEY Oct. 11, 1949.  C. A. DE GIERS  2,484,690
ELECTRIC LIQUID LEVEL INDICATING DEVICE
Filed July 24, 1947  3 Sheets-Sheet 3
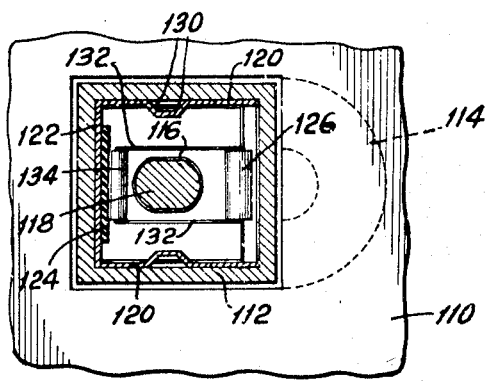
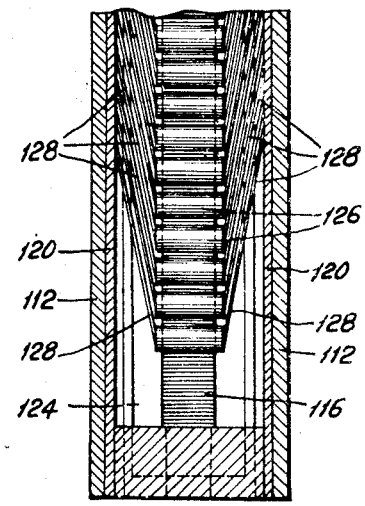
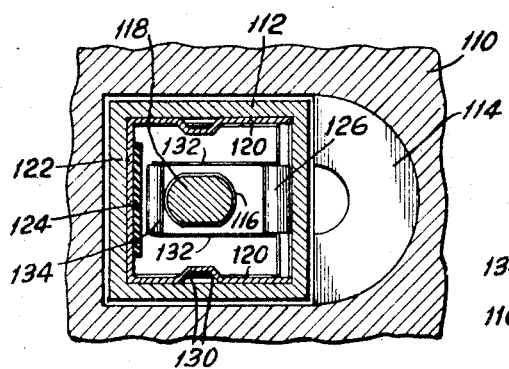
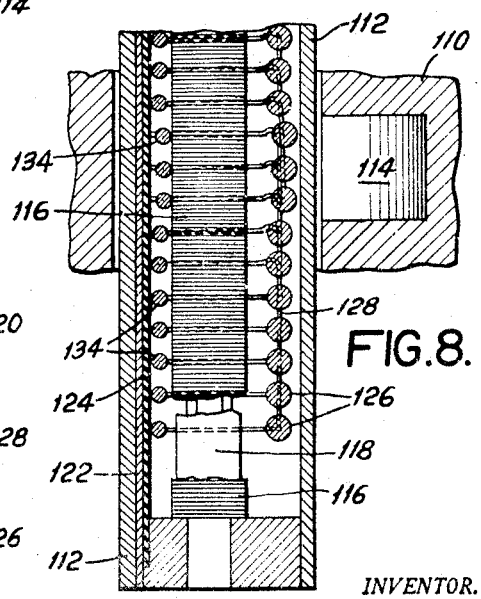
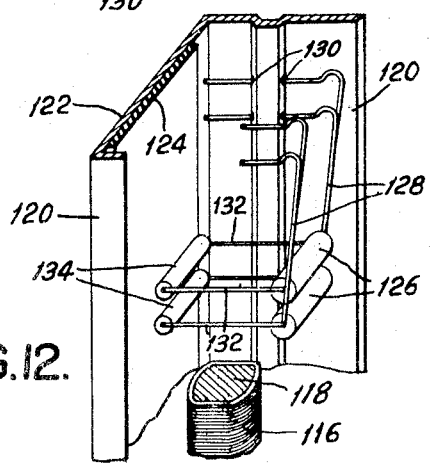
INVENTOR.
CLARENCE A. deGIERS
BY Robert S. Dunham
ATTORNEY Patented Oct. 11, 1949

2,484,690

UNITED STATES PATENT OFFICE 2,484,690

ELECTRIC LIQUID LEVEL INDICATING DEVICE

Clarence A. de Giers, Forest Hills, N. Y., assignor to The Liquidometer Corporation, Long Island City, N. Y., a corporation of Delaware Application July 24, 1947, Serial No. 763,426

9 Claims. (Cl. 201—48)

1

This invention relates to a liquid level indicator controlled by an electrical transmitter which is actuated by a float in a vertical tube instead of by the conventional type of float on the end of a pivoted arm.

The conventional float-operated devices in tanks have certain disadvantages when used for measuring liquids. For example, floats on the ends of pivoted arms require much space for their operation, and that space is sometimes difficult to obtain on account of the essential baffle construction inside the tanks. Also, float arms, even though structurally strong enough for their intended service, are sometimes bent, either accidentally or purposely, thus affecting the accuracy of the device.

A limitation of present day electrically operated transmitters is the short resistance element commonly used. This naturally reduces the sensitivity of the transmitter, and at times causes the indicator pointer to jump, more or less, as the wiper of the transmitter travels along the coils of the resistances from one wire to another.

In aircraft, float-operated tank units of the pivoted arm type are extremely sensitive to shifts in liquid level caused by maneuvering of the craft, and that sensitiveness causes excessive pointer oscillations at the indicator.

The above disadvantages are eliminated, or at least substantially reduced, in the present invention, which provides a resistance coil of an overall length substantially equal to the height of the tank it is to gauge. Closely adjacent to this resistance element are closely spaced narrow flexible resilient reed-like contact elements, each capable of making contact on the resistance. The resistance coil and the contact reeds are enclosed in a vertical metallic tube, thus preventing the transmitter from coming into contact with the liquid being measured. The magnet, mounted on a float, moves along the outside of the enclosing tube, and the reeds, normally out of contact with the resistance move successively into and out of contact with the resistance as the magnet floats by. There are usually more than one reed in contact with the resistance.

Transmitters made in accordance with the present invention have the advantage of compact construction and superior performance.

Another object of the invention, especially important in aircraft, is to provide a transmitter in which adverse effects of transient shifts in the liquid level are substantially reduced.

A further object of the invention is to provide a transmitter having a resistance element many times longer than the conventional transmitter, thereby greatly improving the performance of the unit.

It is also an object of this invention to provide a transmitter in which the electrical element is sparkless, being separated from the liquid under measurement and operated through magnetic means, thus removing the fire hazard when the instrument is used with hazardous liquids.

Another object is to provide a transmitter which occupies a minimum of space and in which the movable element operates entirely within the space it displaces.

The above and other objects and advantages of the invention will appear more fully from the detailed description which follows, taken together with the accompanying drawings, wherein a preferred embodiment of the invention is illustrated. It is to be understood, however, that the drawings are for the purpose of illustration only and are not intended as a definition of the limits of the invention.

Fig. 1 is a schematic illustration of the invention;

Fig. 2 is a sectional view of a transmitter on line 2—2 of Fig. 5;

Fig. 3 is a view of a typical sheet metal blank which has been perforated to form contact elements;

Fig. 4 is a bottom view on line 4—4 of Fig. 2;

Fig. 5 is a sectional view on line 5—5 of Fig. 2 showing an element out of contact with the resistance;

Fig. 6 is a fragmentary view similar to Fig. 5 but with the element in contact position to which it has been drawn by the magnet;

Fig. 7 is a view of a modified form of the invention of Figs. 1–6; and

Figs. 8, 9, 10, 11 and 12 are views of a different embodiment of the invention.

Fig. 1 illustrates the principle of the invention. A resistance element 20 extends substantially throughout the height of the tank to be gauged. Cooperating with the resistance 20 are closely spaced resilient contact elements 22 which are electrically connected together. Elements 22 are normally out of contact with resistance 20, but are capable of making contact therewith when urged by magnetic influences such as the magnet 24 supported on a float 26 at liquid level 28. The liquid level, and tank contents, will be indicated by pointer 30 on graduated chart 32. The conventional indicator illustrated in the drawings comprises coils 34 which move rotor 36 to which pointer 30 is attached. A battery 38 supplies the current.

Details of construction will be readily understood from Figs. 2, 5 and 6, in which a float 40 surrounds a vertical rectangular tube 42 having one of its walls comparatively thin as indicated at 44, Figs. 5 and 6. The float is guided for vertical movement on tube 42 by rollers 46 mounted on the float. A permanent magnet 48 is mounted on the float close to the thin wall 44 of the tube.

Magnet 48 is made of any suitable magnetic material such as Alnico. For applications involving the measurement of liquids it is highly desirable that this element be a permanent magnet. However, there may be rare installations where it will be advantageous to use an electro-magnet in place of the permanent magnet.

The resistance comprises a coil of wire 20 wrapped around an insulating core 50 (Figs. 5 and 6) mounted in an insulating block 52 attached by screws 54 to a bracket 56 closely fitted within tube 42 and having a lip 58 which limits the normal retracted position of contact elements 22, as shown in Fig. 5. The contact position of an element 22 against resistance 20, when element 22 is under the influence of magnet 48, is shown in Fig. 6.

The contact elements 22 could, if desired, be individual hairpin-like wires with their free ends bent and clamped in position between block 52 and bracket 56 by screws 54, but for ease of manufacture and assembly, and for improved performance, the elements are made in groups stamped from thin sheet metal as indicated in Fig. 3 which shows a sheet blanked out to form a series of contact elements. The sheet of elements is then bent and looped to desired shape and the non-perforated ends 60 of the sheet are clamped in position against member 56 by the screws 54 (Figs. 5 and 6). In Fig. 2 the joints between the sheet sections are shown at 62. Since the elements have flat contact surfaces, better contacts are made on the resistances than would be the case if the elements were round wires.

The contact elements must be magnetizable material in order that they may respond to the influence of the magnet. They must flex readily, and they must be resilient in order to return to their normal positions promptly and without distortion. Furthermore, since they are current carriers they must have the qualities of a good electric contact material. For these reasons the presently preferred material for the elements is stainless steel, silver plated.

If desired, tube 42 may be filled with a fluid, such as silicone compound, to protect the contact elements from corrosion. Connections to the resistance strip and contact elements are made by terminals 64, Figs. 1 and 2.

The complete transmitter is surrounded by a tubular housing 66 placed upright in the tank to be gauged. Liquid is permitted to enter the housing 66 through an opening 68 at the bottom of the housing, and excess air is allowed to escape through opening 70 at the top of the housing. These openings restrict the rate of fluid flow through the unit, thereby making the indicator insensitive to momentary shifts in liquid level such as occur when an airplane is maneuvering, but maintaining the float close to the average level to which the liquid again settles when the tank assumes normal position. The indicator will, however, be sensitive to all changes in liquid level due to actual change in the volume of the liquid.

Closely adjacent to openings 68 and 70 are permanent magnets 72 and 74 respectively for the purpose of trapping any magnetic impurities which might otherwise enter housing 66 and attach themselves to magnet 48. Any impurities trapped by magnets 72 and 74 can be removed whenever the unit is overhauled.

In some installations the external diameter of the transmitter housing must be kept as small as possible. If the arrangement of Fig. 5 were reduced in outside diameter, the transmitter elements would have to be made smaller. But there is a limit to that, because the operation of contact elements 22 in regard to their flexing qualities becomes quite critical below a certain minimum and this seriously affects the smallest diameter of float and housing that may be used. To overcome this difficulty, in one variation of the invention, the contact elements are placed on the outer part of the transmitter as shown at the left in Fig. 7. In this modification the electrical elements are enclosed in a housing composed of a plate 76 on the outside of housing 78, and a cover 80. Contact elements 82 are fastened at one end to insulating plate 84 with their free ends extending over resistance strip 86, which in turn is mounted on insulating element 88. When acted upon by magnet 90, elements 82 will make contact with resistance strip 86 as at 92. Magnet 90 is mounted on float 94 and will travel up and down within housing 78 in accordance with the level of the liquid it is indicating. The float may be guided by a central rod 96, which, as illustrated, is square or rectangular in order to prevent circumferential shifting of the float. Rollers 98 are provided to reduce friction between the float and the guide bar. The cross section of the housing 78 need not be circular, as in Fig. 7, but may be square, rectangular, or any other desired shape.

The principles of this invention may also be used to provide other useful features and applications. For instance, at the right in Fig. 7, contact elements such as 100, within a cover 102, may be placed at suitable points to be drawn by the floating magnet 104 into contact with conducting elements such as 106 in order to indicate such things as high or low level of the tank contents.

Another embodiment of the invention is illustrated in Figs. 8, 9, 10, 11 and 12 in which a float 110 surrounds a vertical rectangular tube 112 and carries a magnet 114 close to one wall of the tube. A resistance 116 wound around a rod 118 is supported vertically within tube 112.

Closely fitted within tube 112 is a 3-sided channel having side walls 120 and a back wall 122, the open side of the channel facing towards magnet 114. On the back wall 122 is an insulating strip 124.

Within the tube 112, on the side towards the magnet, and at the open side of channel 120—122 are magnetic contact elements 126 supported one above the other by spring wire supports 128 which extend downwardly from anchorages as at 130 (Fig. 12) in the channel walls 120.

Extending horizontally towards the rear wall 122 of the channel are pairs of horizontal wires 132, each preferably an extension of a spring wire 128 and each pair supporting a contact element 134.

Normally, elements 134 are held by the resiliency of wire supports 128 against insulating strip 124 (Fig. 10) and therefore out of contact with resistance 116. As the magnet 114 moves vertically along tube 112, magnetic elements 126 within range of the magnet 114 are drawn towards the magnet (Fig. 8), and the corresponding contact elements 134 are respectively drawn against resistance 116 (Figs. 8, 11), to actuate the indicator, as in Fig. 1.

The modification just described, while more complicated mechanically, has the advantage that each of its elements may be designed to make the best use of its properties. For instance, the supporting spring (wire supports 128) may be designed for the most suitable flexing properties independently of either magnetic or contact properties. The magnetic element 126 may, in turn, be designed for the best magnetic properties and may not only have considerable mass, but may be made either of soft or hard magnetic materials. Contact element 134 may in turn be selected for optimum electrical contact qualities.

I claim:

1. In a liquid level indicator for a tank, an electrical transmitter, comprising an electric resistor, a series of contact means adjacent to said resistor and respectively arranged at intervals along its length, a common electric conductor spaced from said resistor, each of said contact means comprising a flexible member having one portion fixed in position and having a normal position in which it does not make electrical contact between said resistor and said common conductor and also having a flexed position in which at least part of such contact means is flexed within its elastic limit to make electric contact between a predetermined point respectively of said resistor and said common conductor, each of said contact means including at least a portion which is of magnetic material, a magnet movable in a predetermined path substantially parallel to said resistor and arranged to flex at least one of said contact means adjacent thereto to cause it to make electrical contact between said resistor and said common conductor, and means responsive to the liquid level in said tank for moving said magnet in its path to a position which is a function of the liquid level.

2. An electrical transmitter for use in connection with a liquid level indicator for a tank, in accordance with claim 1, wherein said resistor is disposed in the tank, the liquid level in which is to be measured, and wherein said resistor extends substantially vertically, in respect to the normal attitude of the tank, throughout the range of levels to be indicated.

3. An electrical transmitter for use in connection with a liquid level indicator for a tank, in accordance with claim 1, wherein said means responsive to liquid level comprises a float supported upon the liquid, the level of which is to be measured, and means for guiding said float in a substantially vertical path as the liquid level changes in the tank, and wherein said float carries said magnet rigid therewith, said resistor being disposed in the tank and extending substantially vertically, in respect to the normal attitude of the tank, throughout the range of levels to be indicated.

4. An electrical transmitter for use in connection with a liquid level indicator for a tank, in accordance with claim 1, wherein said contact means comprise a plurality of substantially U-shaped contact elements of magnetic material, said elements being formed in grid-like sets and each set comprising a unitary assemblage of parallel individual elements, each of said elements being independently movable to a position to make electrical contact between said resistor and said common conductor at a point along said resistor peculiar respectively to said elements by flexing within its elastic limit.

5. An electrical transmitter for use in connection with a liquid level indicator for a tank, in accordance with claim 1, wherein said contact means comprise a plurality of magnetic contact elements each of substantially U-shape, said elements being formed in grid-like sets and each set comprising a unitary assemblage of parallel individual elements, each of said elements being independently movable to a position to make electrical contact between said resistor and said common conductor at a point along said resistor peculiar respectively to said elements by flexing within their elastic limit, each of said grid-like sets being formed of sheet material cut out to provide a plurality of parallel elements connected to one another at both ends, and means securing the end portions of said elements in fixed positions in respect to said resistor, said elements being bent in substantially U-shape and surrounding said resistor.

6. An electrical transmitter for use in connection with a liquid level indicator for a tank, in accordance with claim 1, wherein said contact means comprise a plurality of contact elements of magnetic material, said elements being formed in a plurality of grid-like sets, and each set comprising a unitary assemblage of parallel individual elements, each of said elements being independently movable to a position to make electrical contact between said resistor and said common conductor at a point along said resistor peculiar respectively to said elements by flexing within their elastic limit, each set of said grid-like elements having one end of each of said elements integrally connected to a strip extending longitudinally of said resistor, means securing each strip in a fixed position parallel to said resistor with said elements thereof extending substantially perpendicular to the longitudinal extent of said resistor, the other end of each of said elements being unconnected to one another and occupying a normal position out of contact with said resistor, but subject to being individually flexed within their elastic limit into contact with said resistor by said magnet.

7. In a liquid level indicator for a tank, an electrical transmitter, comprising an electric resistor, a series of contact means adjacent to said resistor and respectively arranged at intervals along its length, a common electric conductor spaced from said resistor, each of said contact means comprising a resilient supporting means attached at one portion thereof to a point stationary in respect to said resistor, a magnetic element carried by said resilient means at a part thereof spaced from said attached portion, and a part carried by said resilient means movable upon the flexing thereof within its elastic limit to make electrical contact between a point on said resistor peculiar to said contact means respectively and said common conductor; a magnet movable in a predetermined path substantially parallel to said resistor and arranged when opposite said magnetic elements of each of said contact means respectively to attract said magnetic elements to flex the respectively associated resilient means to make electrical contact as aforesaid, said contact means in their unflexed positions making no electrical connection between said resistor and said common conductor, and means responsive to the liquid level in the tank for moving said magnet to a position which is a function of the liquid level.

8. An electrical transmitter for use in connection with a liquid level indicator for a tank, in accordance with claim 7, wherein said resilient means is so constructed and arranged that said magnetic element carried thereby is disposed on one side of said resistor and said part thereof which is movable on flexing of said resilient means to make electrical contact between said resistor and said common conductor is disposed on the other side of said resistor, all said contact means being permanently electrically connected to said common conductor.

9. An electrical transmitter for use in connection with a liquid level indicator for a tank, in accordance with claim 7, wherein each of said resilient means is a metallic wire bent in a substantially U-shape and with the bight portion of the U bent at a substantial angle to the plane of the remaining portion thereof at the normal position of the parts, each of said magnetic elements being connected between the leg portions of the U at about the point where the bight portion is bent at an angle to the remainder thereof, and each of said parts carried by said resilient means for making electrical contact comprising a metallic element carried by the bight of the U on the opposite side of said resistor from said magnetic elements, all the parts of said contact means being permanently electrically connected to said common conductor.

CLARENCE A. DE GIERS.

REFERENCES CITED

The following references are of record in the file of this patent:

UNITED STATES PATENTS

| Number | Name | Date |
|---|---|---|
| 1,617,287 | Huggins | Feb. 8, 1927 |
| 1,727,344 | Huggins | Sept. 10, 1929 |
| 1,827,525 | Huggins | Oct. 13, 1931 |
| 2,399,994 | Feagin | May 7, 1946 |